United States Patent
Dadkhah Tehrani et al.

(10) Patent No.: US 11,928,505 B2
(45) Date of Patent: Mar. 12, 2024

(54) FEATURE EXTRACTION FROM PERCEPTION DATA FOR PILOT ASSISTANCE WITH HIGH WORKLOAD TASKS

(71) Applicant: LOCKHEED MARTIN CORPORATION, Bethesda, MD (US)

(72) Inventors: Navid Dadkhah Tehrani, Providence, RI (US); Daniel Montrallo Flickinger, Bethesda, MD (US); Igor Cherepinsky, Sandy Hook, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 554 days.

(21) Appl. No.: 17/318,815

(22) Filed: May 12, 2021

(65) Prior Publication Data
US 2022/0365816 A1    Nov. 17, 2022

(51) Int. Cl.
*G06F 9/50* (2006.01)
*B64D 43/00* (2006.01)
(Continued)

(52) U.S. Cl.
CPC .............. *G06F 9/50* (2013.01); *B64D 43/00* (2013.01); *B64D 45/04* (2013.01); *G06F 3/14* (2013.01);
(Continued)

(58) Field of Classification Search
CPC . G06F 9/50; G06F 3/14; G06F 9/4881; G06F 18/2113; G06F 18/24;
(Continued)

(56) References Cited

U.S. PATENT DOCUMENTS 8,493,412 B2 * 7/2013 Suddreth ................ G01C 23/00
  701/3
10,388,049 B2 * 8/2019 Songa ..................... G06T 11/60
(Continued)

FOREIGN PATENT DOCUMENTS

CN    109573029 A   *   4/2019    ............. B64C 39/02
CN    109947123 A   *   6/2019
(Continued)

OTHER PUBLICATIONS

Akhloufi et al., "Unmanned Aerial Systems for Wildland and Forest Fires: Sensing, Perception, Cooperation and Assistance", Drones, (2021), 5(1):15, pp. 1-20.
(Continued)

*Primary Examiner* — Mahendra R Patel
(74) *Attorney, Agent, or Firm* — Foley & Lardner LLP

(57) ABSTRACT

Offline task-based feature processing for aerial vehicles is provided. A system can extract features from a world model generated using sensor information captured by sensors mounted on an aerial vehicle. The system generates a label for each of the features and identifies identify processing levels based on the features. The system selects a processing level for each feature of a subset of features based on a task performed by the aerial vehicle and the label associated with the feature. The system generates one or more processed features by applying the processing level to a respective feature of the subset of the plurality of features. The system presents the one or more processed features on a display device of the aerial vehicle.

18 Claims, 5 Drawing Sheets

(51) Int. Cl.
  *B64D 45/04* (2006.01)
  *G06F 3/14* (2006.01)
  *G06F 9/48* (2006.01)
  *G06F 18/2113* (2023.01)
  *G06F 18/24* (2023.01)
  *G06T 11/00* (2006.01)
  *G06V 10/40* (2022.01)
  *G06V 20/13* (2022.01)

(52) U.S. Cl.
  CPC ........ *G06F 9/4881* (2013.01); *G06F 18/2113* (2023.01); *G06F 18/24* (2023.01); *G06T 11/001* (2013.01); *G06V 10/40* (2022.01); *G06V 20/13* (2022.01); *G06F 2209/509* (2013.01)

(58) Field of Classification Search
  CPC ... G06F 2209/509; B64D 43/00; B64D 45/04; G06T 11/001; G06V 10/40; G06V 20/13; G06V 10/82; G06V 20/17; G06V 20/20; G06V 20/70
  USPC .......................................................... 382/103
  See application file for complete search history.

(56) References Cited

U.S. PATENT DOCUMENTS

| | | | | |
|---|---|---|---|---|
| 11,030,456 | B1* | 6/2021 | Crosby | G06T 7/77 |
| 11,210,851 | B1* | 12/2021 | Nussbaum | H04W 4/021 |
| 11,521,022 | B2* | 12/2022 | Brewington | G06N 20/00 |
| 11,691,755 | B2* | 7/2023 | Gu | G05B 23/0286 701/14 |
| 11,734,910 | B2* | 8/2023 | Mithun | G06N 3/04 382/224 |
| 11,798,191 | B2* | 10/2023 | Alvarez | G01S 7/40 |
| 11,829,449 | B2* | 11/2023 | Parikh | G06V 10/82 |
| 2010/0036549 | A1* | 2/2010 | Kwan | B64D 1/16 701/3 |
| 2019/0147756 | A1* | 5/2019 | Gadgil | B64D 43/00 701/3 |
| 2020/0133611 | A1* | 4/2020 | Feyereisen | G08G 5/0021 |
| 2020/0286388 | A1* | 9/2020 | Velastri | G08G 5/006 |
| 2020/0387727 | A1* | 12/2020 | Mishra | G06V 20/13 |
| 2021/0012116 | A1* | 1/2021 | Urtasun | G06F 18/2155 |
| 2022/0366651 | A1* | 11/2022 | Grancharov | G06T 19/00 |

FOREIGN PATENT DOCUMENTS

| | | | | |
|---|---|---|---|---|
| EP | 3739512 A1 | * | 11/2020 | G01S 13/865 |
| JP | 2019185406 A | * | 10/2019 | B64C 39/024 |
| WO | WO-0036549 A1 | * | 6/2000 | G06K 9/32 |
| WO | WO-2019090072 A1 | * | 5/2019 | G01C 11/04 |
| WO | WO-2021083475 A1 | * | 5/2021 | G06T 19/00 |
| WO | WO-2021118697 A1 | * | 6/2021 | G05D 1/0088 |

OTHER PUBLICATIONS

Extended European Search Report on European Patent Application No. 22165482.5 dated Sep. 27, 2022 (10 pages).

* cited by examiner

//FEATURE EXTRACTION FROM PERCEPTION DATA FOR PILOT ASSISTANCE WITH HIGH WORKLOAD TASKS

TECHNICAL FIELD

This disclosure relates to selecting processing levels to apply to features extracted from sensors mounted on aerial vehicles.

BACKGROUND

Aerial vehicles, such as airplanes or helicopters, can display sets of information to pilots during a flight. The information may be static and not change relative to activities being performed by the aerial vehicle.

SUMMARY

Tasks assigned to aerial vehicles, such as aerial firefighting or search and rescue, can be centrally coordinated, with aircraft routinely dispatched to areas of interest while maintaining voice communication. This method results in high workload for aircraft crewmembers, as this manual communication is of limited bandwidth. Further loss of task efficiency could result from higher latency, and the inability to present a shared visual representation of the task space or working environment. Search and rescue operations are often accomplished by individual aircraft, coordinated by a central authority that divides a search space. However, this approach relies heavily on richly detailed communication, which may be inconsistent or unreliable. It would be advantageous to rely instead on the ability of crewmembers to directly interpret sensor data or make physical observations of the surrounding environment. If a search task involves resources external to the aircraft, such as observations from fixed stations, this data is relayed manually, and can therefore suffer from similar consistency and reliability issues.

Thus, aircraft missions generally involve frequent periods of high pilot workload. Contributing to this high workload are the requirements that pilots obtain, analyze, and disseminate significant amounts of information. This information can include important waypoints, task objectives, other actors, changing conditions, environmental information, and high-level path planning direction. With the nascent inclusion of autonomy, large amounts of sensor data are generated, and pilots must be informed of the surrounding environment to provide at minimum a high level of situational awareness. Further, this on-board information needs to be shared with other aircraft, and remote command centers, to aid in all agents making informed decisions when executing tasks.

Specifically in operations such as search and rescue and aerial firefighting, the use of thermal imaging cameras is beneficial. These sensors can be included in the on-board autonomy system, and used to build an internal map of the surrounding environment for consumption of the various autonomy components. This technical solution can engage the pilot and inform them of important information as curated by the autonomy system. For example, the technical solution can include highlighted features in a heat map, where identified regions of active conflagrations are detected, whether from a forest fire or a ship in distress.

The systems and methods of this technical solution address these and other issues by providing a shared information source for specialized sensor data for pilots, operators, decision makers, and other agents. The systems and methods described herein provide technical improvements to real-time feature extraction and processing, by providing techniques for identifying features from real-time sensor data that correspond to a task assigned to an aerial vehicle, and by providing techniques for presenting this information concisely to pilots and on-board or remote actors and decision makers.

At least one aspect of this technical solution is directed to a method for offline task-based feature processing for aerial vehicles. The method can be performed, for example, by one or more processors coupled to memory of an aerial vehicle. The method can include extracting a plurality of features from a world model generated based on sensor information captured by one or more sensors mounted on the aerial vehicle. The method can include generating a label for each of the plurality of features extracted from the world model. The method can include identifying a plurality of processing levels based on the plurality of features. The method can include selecting, from the plurality of processing levels, a processing level for each feature of a subset of the plurality of features based on the task and the label associated with the feature. The method can include generating one or more processed features by applying the processing level to a respective feature of the subset of the plurality of features. The method can include presenting the one or more processed features on a display device of the aerial vehicle.

In some implementations, the plurality of processing levels each utilize a different amount of computing resources. In some implementations, selecting the processing level for each of the subset of the plurality of features is further based on a distance in the world model from the aerial vehicle to each of the subset of the plurality of features. In some implementations, the method can include selecting, by the one or more processors, the task from a plurality of tasks based on the plurality of features extracted from the world model. In some implementations, the world model comprises a heat map. In some implementations, extracting the plurality of features includes generating a time derivative of the heat map. In some implementations, extracting the plurality of features includes extracting the plurality of features from the heat map and the time derivative of the heat map.

In some implementations, generating the label for each of the plurality of features can include providing each feature of the plurality of features as input to a classification model. In some implementations, generating the label for each of the plurality of features can include determining the label for each feature of the plurality of features based on an output of the classification model. In some implementations, the method can include ranking, using a ranking model, the plurality of features based on the label of each of the plurality of features and the task. In some implementations, the method can include selecting the subset of the plurality of features based on the ranking. In some implementations, selecting the subset of the plurality of features can include selecting a predetermined number of the plurality of features having a ranking that is greater than a ranking of other features of the plurality of features.

In some implementations, the method can include detecting a change in the world model corresponding to the plurality of features. In some implementations, the method can include updating the ranking of the plurality of features based on the change in the world model. In some implementations, the method can include replacing a feature in the subset of the plurality of features with a second feature of the plurality of features previously excluded from the subset based on the updated ranking. In some implementations, the task is aerial firefighting, and the subset of the plurality of features includes one or more of a flame front, a hot spot, an area of high fuel concentration, or a previously burned area.

In some implementations, presenting the one or more processed features on the display device of the aerial vehicle can include generating a highlight annotation for each of the subset of the plurality of features based on the label of each of the subset of the plurality of features. In some implementations, presenting the one or more processed features on the display device of the aerial vehicle can include presenting, on the display device of the aerial vehicle, each of the subset of the plurality of features with the highlight annotation. In some implementations, the task is landing the aerial vehicle, and the one or more processed features include one or more of a structure, a runway, or runway markings.

In some implementations, presenting the one or more processed features can include assigning a color to each of the structure, the runway, or the runway markings. In some implementations, presenting the one or more processed features on the display device of the aerial vehicle can include generating an annotated image of terrain surrounding the aerial vehicle that depicts each of the structure, the runway, or the runway markings annotated with the color. In some implementations, presenting the one or more processed features on the display device of the aerial vehicle can include presenting, by the one or more processors, the annotated image on the display device of the aerial vehicle.

At least one other aspect of this technical solution is directed to a system for offline task-based feature processing for aerial vehicles. The system can include one or more sensors mounted on an aerial vehicle. The system can include one or more processors coupled to memory of the aerial vehicle. The system can extract a plurality of features from a world model generated based on sensor information captured by the one or more sensors mounted on the aerial vehicle. The system can generate a label for each of the plurality of features extracted from the world model. The system can identify a plurality of processing levels based on the plurality of features. The system can selecting, from the plurality of processing levels, a processing level for each feature of a subset of the plurality of features based on the task and the label associated with the feature. The system can generate one or more processed features by applying the processing level to a respective feature of the subset of the plurality of features. The system can present the one or more processed features on a display device of the aerial vehicle.

In some implementations, the plurality of processing levels each utilize a different amount of computing resources. In some implementations, the system can select the processing level for each feature of the subset of the plurality of features further based on distance in the world model from the aerial vehicle to each of the subset of the plurality of features. In some implementations, the system can select the task from a plurality of tasks based on the plurality of features extracted from the world model. In some implementations, the world model comprises a heat map. In some implementations, the system can extract the plurality of features by generating a time derivative of the heat map. In some implementations, the system can extract the plurality of features by extracting the plurality of features from the heat map and the time derivative of the heat map.

In some implementations, the system can generate the label for each of the plurality of features by providing each feature of the plurality of features as input to a classification model. In some implementations, the system can generate the label for each of the plurality of features by determining the label for each feature of the plurality of features based on an output of the classification model. In some implementations, the system can rank, using a ranking model, the plurality of features based on the label of each of the plurality of features and the task. In some implementations, the system can select the subset of the plurality of features based on the ranking.

In some implementations, the system can select the subset of the plurality of features by selecting a predetermined number of the plurality of features having a ranking that is greater than a ranking of other features of the plurality of features. In some implementations, the system can detect a change in the world model corresponding to the plurality of features. In some implementations, the system can update the ranking of the plurality of features based on the change in the world model. In some implementations, the system can replace a feature in the subset of the plurality of features with a second feature of the plurality of features previously excluded from the subset based on the updated ranking.

In some implementations, the task is aerial firefighting, and the one or more processed features include one or more of a flame front, a hot spot, an area of high fuel concentration, or a previously burned area. In some implementations, the system can present the one or more processed features on the display device of the aerial vehicle by generating a highlight annotation for each of the subset of the plurality of features based on the label of each of the subset of the plurality of features. In some implementations, the system can present the one or more processed features on the display device of the aerial vehicle by presenting, on the display device of the aerial vehicle, each of the subset of the plurality of features with the highlight annotation.

In some implementations, the task is landing the aerial vehicle, and the subset of the one or more processed features includes one or more of a structure, a runway, or runway markings. In some implementations, the system can present the one or more processed features on the display device of the aerial vehicle by assigning a color to each of the structure, the runway, or the runway markings. In some implementations, the system can present the one or more processed features on the display device of the aerial vehicle by generating an annotated image of terrain surrounding the aerial vehicle that depicts each of the structure, the runway, or the runway markings annotated with the color. In some implementations, the system can present the one or more processed features on the display device of the aerial vehicle by presenting the annotated image on the display device of the aerial vehicle.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using suitable apparatus, which may take the form of programmable computers running computer programs arranged to implement the aspect. As used in the specification and in the claims, the singular form of "a," "an," and "the" include plural referents unless the context clearly dictates otherwise.

DETAILED DESCRIPTION

Figure 1:
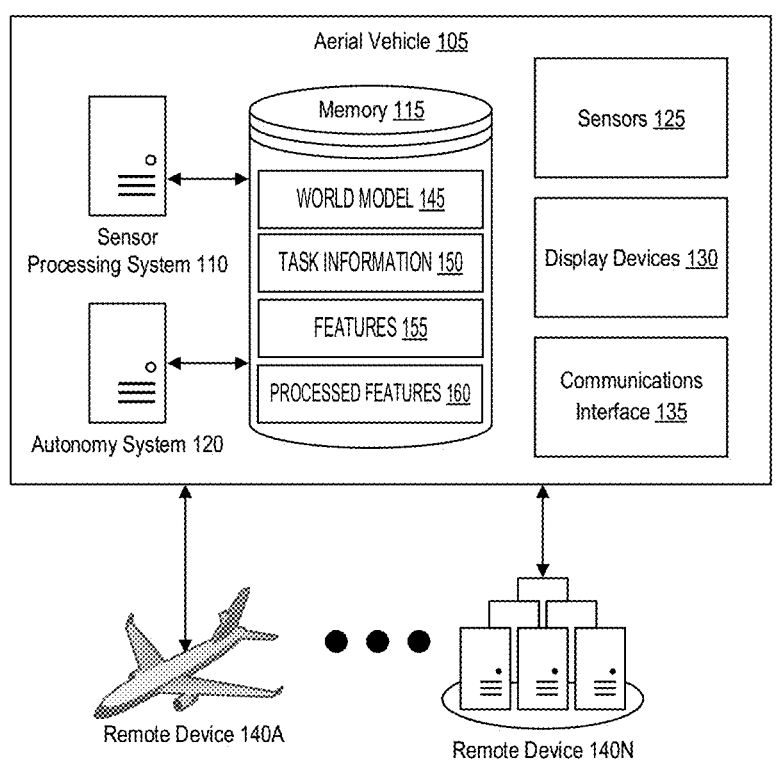
FIG. 1 illustrates a block diagram of a system for offline task-based feature processing for aerial vehicles, in accordance with one or more implementations.

In the following detailed description, reference is made to the accompanying drawings, which form a part hereof. In the drawings, similar symbols typically identify similar components, unless context indicates otherwise. The illustrative implementations described in the detailed description, drawings, and claims are not meant to be limiting. Other implementations may be utilized, and other changes may be made, without departing from the spirit or scope of the subject matter presented. It will be readily understood that the aspects of the present disclosure, as generally described herein, and illustrated in the figures, can be arranged, substituted, combined, and designed in a wide variety of different configurations, all of which are explicitly contemplated and make part of this disclosure.

For purposes of reading the description of the various embodiments below, the following descriptions of the sections of the specification and their respective contents may be helpful:

Section A describes systems, apparatuses, and methods for offline task-based feature processing for aerial vehicles; and Section B describes a computer system to be used in implementing various components described herein.

A. Offline Task-Based Feature Processing for Aerial Vehicles

The systems, apparatuses, and methods described herein allow pilots, operators, decision makers, and other agents to have a shared information source for specialized sensor data. The technical solution allows for identifying features corresponding to a task assigned to an aerial vehicle from sensor data, and selecting processing levels for each feature such that the features can be presented concisely to pilots, on-board or remote actors, and decision makers.

On-aircraft sensor systems can include light detection and ranging (LiDAR), visible light, and infrared light sensors. Using these sensors, information from the surrounding environment can be continually retained and updated as part of a comprehensive world model within an autonomy system of the aerial vehicle. The systems and methods described herein can filter through information gathered to generate this world model, and extract features that are pertinent to tasks assigned to the aerial vehicle, such as search and rescue or aerial firefighting.

For example, given a plan-form aligned two dimensional heat map generated from multiple sensors, features such as a current flame front, potential hot spots, areas of high fuel concentration, and previously burned areas are presented to multiple agents to aid in task planning and decision making. Further enhancement of this feature extraction comes from the generation of a heat map prime, that is, the time derivative of the heat map. In a search and rescue scenario, feature extraction from the world model provides clear highlights of interesting objects, significantly reducing task workload. Likewise, additional levels of processing can be applied to different sensor data in accordance with tasks being performed.

The systems and methods described herein can identify and select levels of processing data to reduce human workload, particularly for pilots, and improve tasked-based visibility and communication of information. This system can be integrated with an autonomy system present in an aerial vehicle, taking advantage of infrastructure for data representation, display, storage, and transport. Task-centric feature extraction provided by the on-board autonomy can improve information-processing performance relating to discerning or identifying important task-related objects in the surrounding environment, and additionally provides sensory input outside the abilities of human perception. This reduces human workload by distilling important attributes and objects from vast amounts of information. This important information is presented to all agents with a clear and concise interface built in to the primary displays for light or other operations.

Specific map overlays for heat maps and similar perception data generation, plus iconography mapping for interesting features and objects, are provided as examples, but other sensor processing techniques and levels are possible, as described herein. Further, the system decentralizes operations by seamlessly sharing information throughout the system. Perception data and extracted features can be accessed from a variety of devices connected to the autonomy system, both on and off the aircraft. The aforementioned components each contribute to significant reduction in workload for pilots, operators, managers, and other agents all working to accomplish specific operations, as well as improved processing and display capability for real-time sensor data. Offloading tasks to the autonomy system and increasing information retention and communication performance improves overall performance compared to other techniques.

Referring now to FIG. 1, depicted is a block diagram of an environment or a system 100 for offline task-based feature processing for aerial vehicles. In brief overview, the system 100 can include at least one aerial vehicle 105 and one or more remote devices 140A-140N (sometimes referred to generally as remote device(s) 140). The aerial vehicle can include at least one sensor processing system 110, at least one memory 115, at least one autonomy system 120, one or more sensors 125, one or more display devices 130, and at least one communications interface 135. The memory 115 can store at least one world model 145, task information 150, one or more features 155, and one or more processed features 160. The sensor processing system 110, the memory 115, the autonomy system 120, the sensors 125, the display devices 130, and the communications interface 135 may be connected or communicatively coupled with one another. The sensor processing system 110, the memory 115, the autonomy system 120, the sensors 125, the display devices 130, and the communications interface 135 may be implemented at least in part using one or more of the components described herein in Section B.

The aerial vehicle 105 can be any type of aerial vehicle, such as an airplane, a helicopter, a drone, or any other type of aerial vehicle. The aerial vehicle 105 can be operated by one or more pilots. In some implementations, the aerial vehicle 105 can be an autonomous aerial vehicle, which is piloted at least in part by the autonomy system 120. The aerial vehicle 105 can be dispatched to address one or more remote issues by completing one or more assigned tasks. Such assigned tasks can include, for example, aerial firefighting or search and rescue. In implementations where the aerial vehicle is dispatched to address a fire, the aerial vehicle 105 may be equipped with one or more fire suppression devices (not pictured), such as water or other flame retardant materials. The aerial vehicle 105 can communicate with one or more remote devices 140 via the communications interface 135.

The communications interface 135 can communicate information to and from the remote devices 140. The communications interface 135 can include a radio communications device that transmits and receives radio signals from one or more of the remote devices 140. In some implementations, the communications interface 135 can include one or more processors that encrypt or decrypt data transmitted to and from the remote devices 140. The radio signals received from the remote devices 140 can include, for example, any of the task information 150, which can indicate one or more tasks to which the aerial vehicle is assigned. In some implementations, the radio signals received from the remote devices 140 can include information relating to processing levels, such as indications to prioritize processing and display of particular sensor information.

The radio signals transmitted from the aerial vehicle 105 to the remote devices 140 via the communications interface 135 can include, for example, information relating to one or more features 155 detected in a surrounding environment. The radio signals including the information relating to features 155 can include location data for each feature 155. For example, if the aerial vehicle 105 is assigned a firefighting task, the features 155 could be detected flame fronts. The aerial vehicle can transmit location information relating to each of the detected flame fronts 155 to the remote devices 140. The location relating to the features can include any other attributes of the feature 155, including detected feature size or sensor values (e.g., temperature, etc.) corresponding to the feature. In some implementations, the signals transmitted via the communications interface 135 can include sensor information captured by the sensors 125. Other information transmitted to the remote devices 140 can include any information generated or processed by the sensor processing system 110 or the autonomy system 120.

The remote devices 140 can be any remote device capable of communicating information to and from the aerial vehicle 105 via the communications interface 135. Non-limiting examples of remote devices 140 can include aircraft (e.g., planes, helicopters, drones, etc.), ground control devices, servers, data centers, base stations, or any other type of computing device. The remote devices 140 can transmit task information to the aerial vehicle 105, which can be stored by the aerial vehicle in the memory 115 as the task information 150. Remote devices 140 such as ground control devices can communicate location information or guidance information to the aerial vehicle. The remote devices 140 can receive and store any of the information transmitted by the aerial vehicle 105.

The sensors 125 can be mounted on the interior or the exterior of the aerial vehicle 105. Non-limiting examples of the sensors 125 include LiDAR sensors, visible light sensors (e.g., cameras, video capture devices, etc.), infrared light sensors, accelerometers, gyroscopes, elevation sensors, pressure sensors, temperature sensors, force sensors, proximity sensors, radar sensors, angle-of-attack sensors, global positioning system (GPS) sensors, thermal infrared cameras, and thermal imaging cameras, among others. Sensor information can be retrieved from the sensors 125 by one or more of the autonomy system 120 or the sensor processing system 110. In some implementations, one or more of the sensors 125 can provide sensor data periodically (e.g., in a batch transmission, etc.) to the autonomy system 120 or the sensor processing system 110. In some implementations, one or more of the sensors 125 can provide sensor data to the autonomy system 120 or the sensor processing system 110 upon receiving a request for sensor data from the autonomy system 120 or the sensor processing system 110.

The display devices 130 can include any type of device capable of presenting information to a user (not pictured) that operates the aerial vehicle 105. The display devices 130 can be positioned within the aerial vehicle 105 such that they can be viewed while the user is operating the aerial vehicle 105. The display devices 130 can include devices that present specific sensor information, such as speed, direction, velocity, or location. The display devices 130 can also be general display devices that can present the processed features 160 generated by the sensor processing system 110, as described herein. The display devices 130 can include an electronic flight instrument system (EFIS), which can include one or more primary flight displays, one or more multi-function displays, or other displays. Types of display devices can include liquid crystal displays (LCDs), light-emitting diode (LED) displays, organic light-emitting diode (OLED) displays, bi-stable displays (e.g., e-ink, etc.), among others. As described herein, the sensor processing system 110 or the autonomy system 120 can present information, such as the processed features 160, on one or more of the display devices 130. The display devices 130 can receive display instructions or image data (e.g., including any of the processed features 160, etc.), from the sensor processing system 110, which causes one or more of the display devices 130 to display information corresponding to the display instructions or the image data.

The memory 115 can be a computer-readable memory that can store or maintain any of the information described herein. The memory can maintain one or more data structures, which may contain, index, or otherwise store each of the values, pluralities, sets, variables, vectors, numbers, or thresholds described herein. The memory 115 can be accessed using one or more memory addresses, index values, or identifiers of any item, structure, or region maintained in the memory 115. The memory 115 can be accessed by the sensor processing system 110 or the autonomy system 120. In some implementations, other computing devices present on the aerial vehicle 105 can access the memory 115. The sensor processing system 110 or the autonomy system 120 can store the results of any or all computations in one or more data structures in the memory 115, such that the data structures are indexed or identified with appropriate values for later access.

The memory 115 can store a world model 145, for example, in one or more data structures. As described herein, the autonomy system 120 can retrieve sensor data from the sensors 125 to generate the world model 145. The world model 145 can be a collection of related sensor information that models the environment surrounding the aerial vehicle. The sensor information in the world model can be stored in association with one or more timestamps, identifying the time the sensors 125 captured the particular sensor information. The world model 145 can be used by the autonomy system 120 to perform one or more automated aerial vehicle operations. However, the sensor processing system 110 can also access this information (as described in detail herein), offline task-based feature processing. The world model 145 can be a collection of different collections of sensor data that represent the environment surrounding the aerial vehicle, including height maps, temperature maps, red-green-blue (RGB) channels (e.g., from visible light cameras), terrain information, weather information, or visibility information, among any other type of sensor data. The world model 145 can be iteratively updated by the autonomy system 120 as additional sensor information is captured by processed by the autonomy system 120. In addition to the functionalities described herein with respect to the sensor processing system, the world map 145 can be used by the autonomy system 120 to perform one or more automated navigational tasks.

The memory 115 can store task information 150, for example, in one or more data structures. The task information 150 can include a task to which the aerial vehicle 105 has been assigned. Non-limiting examples of tasks can include aerial firefighting, search and rescue, aerial reconnaissance, or flight-related activities such as landing, among others. The task information 150 can be provided, for example, from one or more of the remote devices 140. In some implementations, the task information can be provided from another source, such as the user operating the aerial vehicle 105 (e.g., via one or more input devices, etc.). In some implementations, the task information 150 can include more than one assigned task. Each assigned task can be assigned a task priority, and the task information 150 can include a ranking of each task by the priority values.

Each task specified in the task information can be associated with one or more levels of processing. In addition, each task can identify one or more types of sensor data, or features 155, that are relevant to the particular task. In some implementations, where classification models are used to extract features 155 from the sensor information in the world model 145, a task identified in the task information 150 can include an identification of a classification model corresponding to a particular feature type relevant to the task. The task information 150 can be accessed by the sensor processing system 110 to perform one or more of the operations described herein. In addition, as new tasks are determined (e.g., either via user input, in response to receipt or assignment from a remote device 140, or by the sensor processing system 110, etc.), the task information 150, and data associated therewith, can be updated to reflect the new tasks.

The memory 115 can store one or more features 155, for example, in one or more data structures. The features 155 can correspond to portions of sensor data extracted from the world model 145. As described in detail herein, the features 155 can be extracted, labeled, and processed by the sensor processing system 110 to produce the processed features 160. In general, the features 155 can correspond to portions of sensor data representing the environment surrounding the aerial vehicle 105 that are relevant to a task assigned to the aerial vehicle 105. Some examples of features 155 can include, for example, portions of sensor information representing flame fronts, structures (e.g., buildings, bridges, towers, etc.), hot spots, roads, vehicles (e.g., ground, water, or other aerial vehicles), weather features (e.g., clouds, smoke plumes, smoke patterns, etc.), or people (e.g., in a search and rescue environment), among others. The features 155 can be updated by the sensor processing system 110 to include features currently surrounding the aerial vehicle 105. In some implementations, each of the features 155 can be associated with a ranking value (e.g., generated by the sensor processing system 110, etc.) that represents a display priority of the feature 155. Each feature 155 can be associated with a distance value, which represents the distance of the feature 155 in the surrounding environment from the aerial vehicle 105.

The memory 115 can store the processed features 160, for example, in one or more data structures. The processed features 160 can be generated by the sensor processing system 110, as described herein, by applying various processing levels to the features 155. The processed features 160 can include image data, such as a processed heat map generated by the sensor processing system, including one or more annotations. The processed features 160 can be updated iteratively by the sensor processing system 110, for example, as the world map 145 changes and additional features 155 are identified. Non-limiting examples of processed features 160 can include annotated height maps of the environment surrounding the aerial vehicle 105, annotated rotated images of a region below the aerial vehicle 105 (e.g., an annotated runway image, annotated image with structures, etc.), or time derivatives of heat maps (e.g., indicating direction of flame path, etc.), among others. In some implementations, the processed features 160 can include display instructions to display sensor information associated with the features 155 from which the processed features 160 was generated, such as temperature information (e.g., for flame fronts, etc.), distance information (e.g., for classified objects of interest, etc.), or any other relevant sensor information.

The autonomy system 120 can include can include at least one processor and a memory (e.g., a processing circuit). The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. In general, the autonomy system 120 can automate various navigational tasks, or other aerial vehicle 105 related tasks, by executing corresponding computer-executable instructions. The autonomy system 120 can generate the world model 145 by retrieving sensor information from the sensors 125. The autonomy system 120 can retrieve the sensor data, for example, on a periodic basis, or continuously as sensor information is detected by the sensors 125. The autonomy system 105 can store the sensor information in association with one or more timestamps corresponding to when the sensor information was received as part of the world model 145.

The sensor processing system 110 can include at least one processor and a memory (e.g., a processing circuit). The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. In some implementations, the processing circuit can include a graphics-processing unit (GPU), which can perform any of the processing operations described herein. The memory may include, but is not limited to, electronic, optical, magnetic, or any other storage or transmission device capable of providing the processor with program instructions. The sensor processing system 110 can communicate with any of the components of the aerial vehicle 105, including the autonomy system 120, the memory 115, the sensors 125, the display devices 130, and the communication interface 135, to perform the operations described herein.

Referring now to the operations of the sensor processing system 110, the sensor processing system 110 can extract one or more of the features 155 from the world model 145 based on the task information 150. As described herein above, the world model 145 can include sensor information captured by the sensors 125. The sensor information can include various channels that represent aspects of the environment surrounding the vehicle. To extract features from the sensor information, the sensor processing system 110 can identify one or more extraction models associated with a task assigned to the aerial vehicle 105, according to the task information 150. As described herein, the task information 150 can include indications of one more tasks assigned to the aerial vehicle 105, and one or more classification or extraction models associated with the tasks. In addition, the task information 150 can include indications of the types of sensor information from which the sensor processing system 110 should extract the one or more features. For example, if the task indicates that the aerial vehicle 105 has been dispatched in an aerial firefighting capacity, the task can indicate that the sensor information that should be analyzed by the sensor processing system 110 includes heat maps generated by thermal cameras.

Furthering the example above, the sensor processing system 110 can identify one or more feature extraction models associated with the task. For example, the sensor processing system 110 can access the task information 150 to retrieve a list of models associated with aerial firefighting and execute the identified models on the thermal maps retrieved from the world model 145. The extraction model can be, for example, a machine-learning model that is trained to identify one or more portions of interest in the sensor information identified in the task information 150. Non-limiting examples of extraction models includes bounding box regressor models or image segmentation models. The extraction model can be trained using an offline process on a set of training data (e.g., training sensor information, etc.) associated with labels (e.g., ground truth data, etc.) of portions of interest that are associated with the task.

Using the extraction model, the sensor processing system 110 can identify and extract one or more portions of the sensor information. The extraction model can be trained to receive the type of sensor information identified in the task information 150 as input, and identify or one or more regions of interest as output (e.g., a bounding box over a region of a thermal map, etc.). The sensor processing system 110 can extract the portions of interest by copying the portions of sensor data to a region of memory in the sensor processing system 110. In some implementations, the task information 150 can specify additional processing to extract additional features from the sensor information in the world model 145. Furthering the aerial firefighting example above, the task information 150 can include instructions for the sensor processing system 110 to generate a time derivative of the heat map captured by the thermal cameras mounted on the aerial vehicle (e.g., one or more of the sensors 125). Based on these instructions, the sensor processing system 110 can generate a time derivative of the heat map in the world model 145, and store the time-derivative in the memory of the sensor processing system 110. Then, the sensor processing system 110 can extract one or more of the features 155 from both the heat map and the time derivative of the heat map, each using a corresponding extraction model as described herein above. By performing additional processing, such as time-derivatives, the sensor processing system 110 can identify additional characteristics of the environment that are relevant to a task assigned to the aerial vehicle 105, such as the direction of flame fronts.

In some implementations, if a particular task is not indicated in the task information 150, the sensor processing system 110 can select a task from a list of potential tasks based on features 155 extracted from the world model 145. In such implementations, the sensor processing system 110 can perform "default" feature extraction, which can include executing a default feature extraction model on default types of sensor data. In addition, the sensor processing system 110 can execute a default classification model, such as a convolutional neural network (CNN), on any features 155 extracted using the default feature extraction model. The sensor processing system 110 can then select a task from a list of tasks in the task information 150 based on the classified features output by the default classification model. For example, if the default classification model outputs information indicating that the thermal map includes a large number of hotspots, or a large area that appears to be a flame front, the sensor processing system 110 can access the list of tasks in the task information 150 to identify tasks corresponding to flame fronts. In this case, the sensor processing system 110 can select the aerial firefighting task, and perform more rigorous feature extraction and classification using the models associated with the aerial firefighting task. Although aerial firefighting has been used as an example, it should be understood that other tasks are also possible, such as search and rescue, reconnaissance, or flight-related tasks such as landing, among others.

Once the sensor processing system 110 has extracted one or more features 155, the sensor processing system 110 can generate a label for each feature 155 extracted from the world model 145. To do so, the sensor processing system 110 can execute one or more classification models associated with the task assigned to the aerial vehicle 105. The sensor processing system 110 can identify the classification models associated with the task by accessing and retrieving identifiers of the classification models from the task information 150. The classification models can be any sort of classification model, such as a neural network (e.g., a deep neural network (DNN), a CNN, etc.), a recurrent neural network (RNN), a linear regression model, a support vector machine (SVM) model, or any other type of classification model. The classification models can be trained on training data that includes features associated with the associated task and labels indicating a ground-truth classification of each item of training data. The classification models can be trained using unsupervised learning or supervised learning techniques.

As described herein above, the features 155 can include portions of sensor data that the sensor processing system 110 has identified as relevant to the task assigned to the aerial vehicle 105. To classify each feature, the sensor processing system 110 can provide each feature 155 as input to the one or more identified classification models. The sensor processing system 110 can execute the classification model over the input data and generate an output classification for the feature. The output classification can be generated, for example, as a softmax output layer, which can identify probability values that the input feature corresponds to a particular classification. From the softmax layer, the sensor processing system 110 can select the classification corresponding to the highest probability. Then, the sensor processing system 110 can determine a label for each feature 155 by identifying a label corresponding to the classification of the feature 155, and storing the label in association with the feature 155 to create a labeled feature 155. The sensor processing system 110 can repeat this process for each feature 155 extracted from the world model 145 until all features 155 are labeled.

Once the features 155 have been labeled, the sensor processing system 110 can identify one or more processing levels each of the features 155. A processing level corresponds to an amount of computation processing performed on the feature 155, for example, prior to determining whether to present the feature 155 to an operator of the aerial vehicle 105. In general, each processing level can utilize a different amount of computing resources, and thus the sensor processing system 110 performs a type of load balancing by identifying and selectively applying processing levels for each feature 155. Non-limiting examples of processing levels include, for example, annotating the feature 155 in the sensor information (e.g., an image, etc.) with a particular color, modifying a heat map to include a bounding box or bounding region surrounding a particular feature 155, or drawing the label associated with the feature 155 adjacent to the feature 155 in the sensor information (e.g., an image of the environment, a heat map, etc.), among others. To identify potential processing levels to apply to each feature, the sensor processing system 110 can access a lookup table of processing levels (e.g., not pictured but stored in the memory 115, etc.), to retrieve one or more processing levels associated with the label associated with each feature. The sensor processing system 110 can store each feature 155 in association with the list of processing levels corresponding to the feature 155.

Then, the sensor processing system 110 can select a processing level for each feature 155 based on the task and the label associated with each feature 155. In some implementations, the sensor processing system 110 can select a subset of the features 155 to process. For example, to select a subset of the features 155, the sensor processing system 110 can first use a ranking model to assign a ranking to each feature 155. The ranking model can be, for example, a machine-learned ranking model trained using supervised, semi-supervised, or reinforcement learning. The ranking model can be trained using a training data set that includes lists of feature labels with a partial order specified between items in each list. In some implementations, the ranking model can be associated with the task assigned to the aerial vehicle 105, and the ranking model can be trained using training data including lists of feature labels corresponding to the task. The ranking model can be trained in an offline process.

To rank the features 155, the sensor processing system 110 can input the labels associated with each feature 155 to the ranking model, and execute the ranking model over the labels to generate an order of the labels, and therefore a ranked order for each of the features 155. In some implementations, the ranking model can be trained to generate an order of features 155 such that the most relevant features for the task associated with the ranking model have the highest ranking, and the least relevant have the lowest ranking. To select a subset of the features 155, the sensor processing system 110 can select the features 155 as members of the subset that have the highest ranking (e.g., a predetermined number of highest ranking features 155, or a number of features 155 having a ranking higher than a predetermined threshold, etc.). In some implementations, the sensor processing system 110 can always include certain important features (e.g., having a predetermined label, etc.) in the subset. This priority label information (e.g., critical to task, not critical to task, etc.) can be included in the task information 150.

For example, in cases where a feature 155 is critical to a particular task, the sensor processing system 110 can always process this feature if it has been extracted from the world model 145. In some implementations, the sensor processing system 110 can select the subset based on other factors, such as a proximity of the feature 155 as represented in the world model 145 to the aerial vehicle 105. In general, the sensor processing system 110 can apply higher levels of processing to features 155 that are more proximate (e.g., relative to other features extracted from the world model 145, etc.) to the aerial vehicle 105. Thus, features 155 that are far away (e.g., greater than a predetermined threshold distance, etc.) from the aerial vehicle 105 may not be immediately critical to the task assigned to the aerial vehicle 105, and can be excluded the subset of features processed by the sensor processing system 110. Likewise, features 155 that are proximate to the aerial vehicle 105 can be included in the subset, and subsequently ranked using the ranking model as described above to assign a rank to each feature 155 in the subset. This approach to load balancing feature processing by the sensor processing system 110 provides a technical improvement to processing systems by reducing the overall amount of processing required to display features relevant to tasks assigned to aerial vehicles, such as the aerial vehicle 105.

However, the features 155 in the subset can change as the world model 145 is updated. In some implementations, the sensor processing system 110 can continuously, or periodically, check for or receive indications of updates to the world model 145. These updates can arise from additional sensor data being captured and included in the world model by the autonomy system 120. Upon detecting an update, the sensor processing system 110 can reanalyze (e.g., extract, label, etc.) the features 155 represented in the world model 145 as described herein above. Once the labels have been assigned to the updated features 155, the sensor processing system 110 can re-rank the features using the ranking model, based on distance, or a combination thereof, as described above. Then, the sensor processing system 110 can replace features in the subset of features 155 using the new ranking of features 155. Accordingly, features 155 that were previously excluded from further processing can be processed as they become more relevant to the task assigned to the aerial vehicle 105.

Once the sensor processing system 110 has selected a subset of the features (e.g., which in some implementations can include all identified features 155, etc.), the sensor processing system 110 can select a processing level for each feature 155. As described above, each selected feature 155 can be associated with a list of possible processing levels, each associated with a corresponding amount of computing resource consumption. To balance the computational load of processing and presenting each selected feature 155 in real-time, the sensor processing system 110 can select a processing level for each feature, which can correspond to one or more processing operations to apply to each feature 155. In some implementations, the sensor processing system 110 can select the processing level for each feature 155 based on a distance of the feature 155 in the world model 145 from the aerial vehicle 105. As mentioned above, the features 155 that are closer to the aerial vehicle 105 are generally assumed to be more relevant to the task assigned to the aerial vehicle 105. Therefore, the sensor processing system 110 can select a higher level of processing for features that are close (e.g., within a predetermined distance, etc.) to the aerial vehicle 105. In some implementations, the sensor processing system 110 can select processing levels in a tiered approach, for example, by selecting the highest level of processing for the closest N features, and then the second highest level of processing for the next closest M features, and so on.

In some implementations, the sensor processing system 110 can select a processing level for each selected feature 155 based on the ranking assigned to each selected feature 155. In some cases, certain features 155 may be more relevant to certain tasks even when they may not be the closest features 155 to the aerial vehicle. To accommodate for this case, in some implementations, the sensor processing system 110 can select a higher level of processing for features that are associated with a higher ranking (e.g., greater than a predetermined ranking, etc.). In some implementations, the sensor processing system 110 can select processing levels in a tiered approach, for example, by selecting the highest level of processing for the highest N ranking features, and then the second highest level of processing for the next highest M ranking features, and so on.

After selecting a processing level for each of the selected features 155, the sensor processing system 110 can generate one or more processed features 160 by applying the selected processing level to each selected feature 155. To apply a processing level, the sensor processing system 110 can identify each of the operations corresponding to the processing level and the corresponding label. For example, the sensor processing system 110 can identify each processing operation associated with the selected processing level and the selected feature 155 label from a lookup table. Upon identifying each processing operation, the sensor processing system 110 can perform each processing operation iteratively to generate the processed features 160. In some implementations, the sensor processing system 110 can apply the processing operation directly to the sensor information corresponding to the feature 155 to generate the processed features 160. As described herein above, the processed features 160 can include displayable data, such as display instructions or image data, which represents the feature 155 that has been processed by applying the selected processing level.

For example, in the case where the selected features 155 are labeled as a flame front, a hot spot, an area of high fuel concentration, or a previously burned area, the processing operations associated with the features 155 can include generating a highlight annotation for based on the label of each feature 155. For example, each label can correspond to a particular highlight color. The sensor processing system 110 can apply the processing level by annotating sensor information (e.g., the thermal map, etc.) with the highlight regions corresponding to the processing level and store the result as the processed features 160. In some implementations, the processing level of a selected feature 155 can indicate that the label associated with the feature 155 should be displayed adjacent to the feature 155. The sensor processing system 110 can then modify the sensor information (e.g., the thermal map) to include the label (e.g., "flame front," etc.). In some implementations, generating the processed features 160 can include generating image data corresponding to the sensor information (e.g., generating an image from a two-dimensional array of thermal readings in a thermal map, etc.), and subsequently modifying the image data with annotations corresponding to the processing level.

In another example where the task is landing the aerial vehicle 105, the features 155 may include one or more of a structure, a runway, or runway markings. In some implementations, the sensor data used to identify said features 155 can be an RGB image of terrain surrounding the aerial vehicle 105. As above, the sensor processing system 110 can identify each processing operation associated with the processing level selected for each feature 155. For example, a processing operation in this case can include assigning a color to each of the features 155 corresponding to the structure, the runway, and the runway markings. Then, the processing operations can include annotating the RGB with each of the assigned colors, such that each identified feature 155 is highlighted with its assigned color. The annotated image can be stored as the processed features 160 for subsequent display.

Once the processed features 160 have been generated, the sensor processing system 110 can present the processed features 160 on one or more of the display devices 130 of the aerial vehicle 105. As described herein above, the sensor processing system 110 can include image data or display instructions that cause the display devices 130 to present the processed features 160 to the user operating the aerial vehicle 105. To present the processed features, the sensor processing system 110 can retrieve the processed features 160 from the memory and communicate the processed features 160 to one or more of the display devices 130. In some implementations, the sensor processing system 110 can select which of the display devices 130 to display the processed features 160 (e.g., the image data, annotated sensor information, etc.) based on the labels corresponding to the processed features 160. For example, the task information 150 can indicate that processed features 160 associated with particular labels should be displayed on certain display devices 130. This information can be retrieved from the task information 150 and used to select the display devices 130 to present the processed features 160. In some implementations, the sensor processing system 110 can transmit the processed features 160 to one or more of the remote devices 140 via the communications interface 135.

Figure 2:
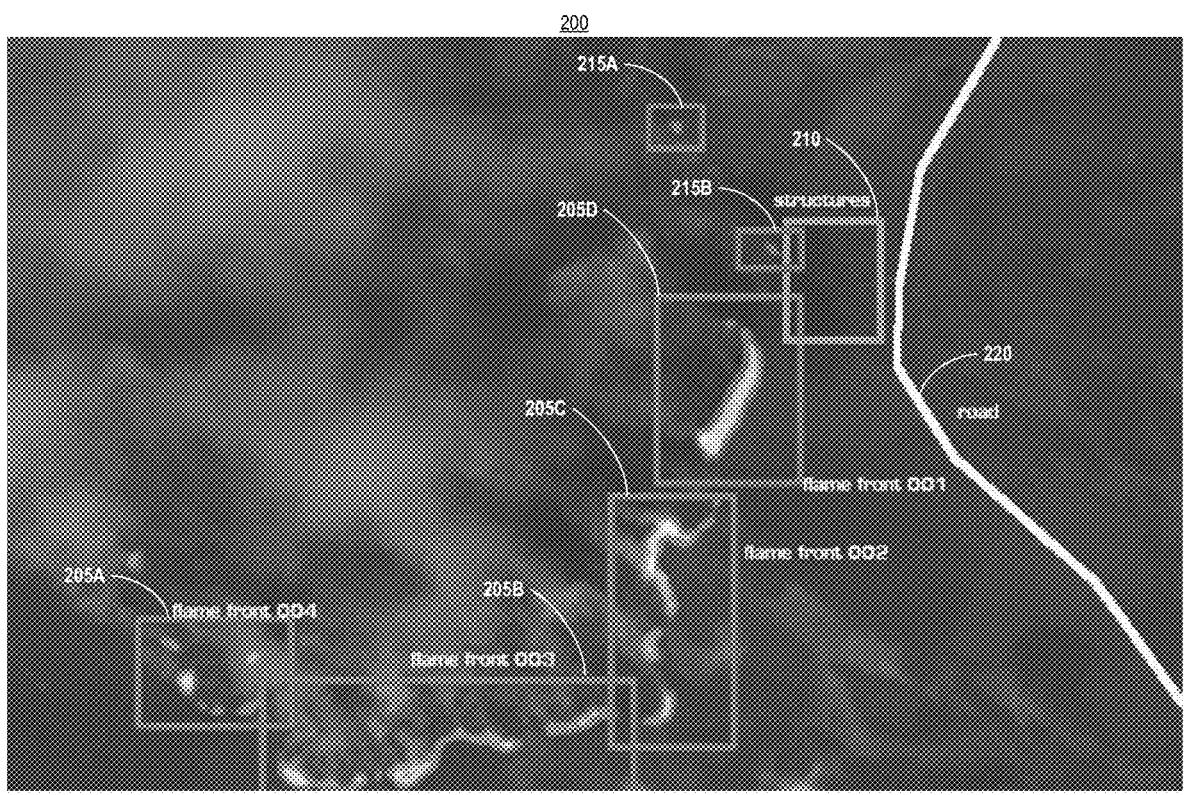
FIG. 2 illustrates an example annotated thermal image generated from features extracted from a world model, in accordance with one or more implementations.

Referring now to FIG. 2, illustrated is an example thermal image 200 generated from one or more features 155 extracted from the world model 145 by the sensor processing system 110, in accordance with one or more implementations. In thermal image 200, regions corresponding to hotter areas, such as previously burned areas or areas currently burning, are indicated according to their temperature from blue (e.g., cold) to white (e.g., very hot). Thus, areas that are yellow and orange each correspond to areas that could be burning. As shown, each of the regions of the thermal image 200 corresponding to the flame fronts 205A-205D. Without the processing techniques described herein above, neither the bounding boxes surrounding the flame fronts 205A-205D, nor the labels identifying the flame fronts 205A-205D, would be represented in the thermal image.

Also as shown, an additional feature 155 related to aerial firefighting has been identified and annotated with a corresponding label "structure" and a corresponding bounding box color. Other processing levels are also evidenced here by the previously burned areas 215A and 215B, which include a bounding box annotation but do not include a label. A road 220 has also been identified and annotated with a white highlight color along the region of the thermal image corresponding to the road 220, and marked with a corresponding label.

Figure 3:
FIG. 3 illustrates an example annotated runway image generated from features extracted from a world model, in accordance with one or more implementations.

Referring now to FIG. 3, illustrated is an example annotated runway image 300 generated from one or more features 155 extracted from the world model 145 by the sensor processing system 110, in accordance with one or more implementations. In this example, portions of an RGB image have been processed with annotations relevant to a landing procedure (e.g., the task assigned to the aerial vehicle). As shown, each of the aiming point markings 305, the touchdown zone markings 310, and the threshold zone markings 315 have been identified, extracted, and processed by the sensor processing system 110. In this example, the processing levels corresponding to each identified feature 155 indicate processing operations that include selecting a corresponding color for each feature 155 and highlighting each region of the RGB image corresponding to the feature with the selected color.

Figure 4:
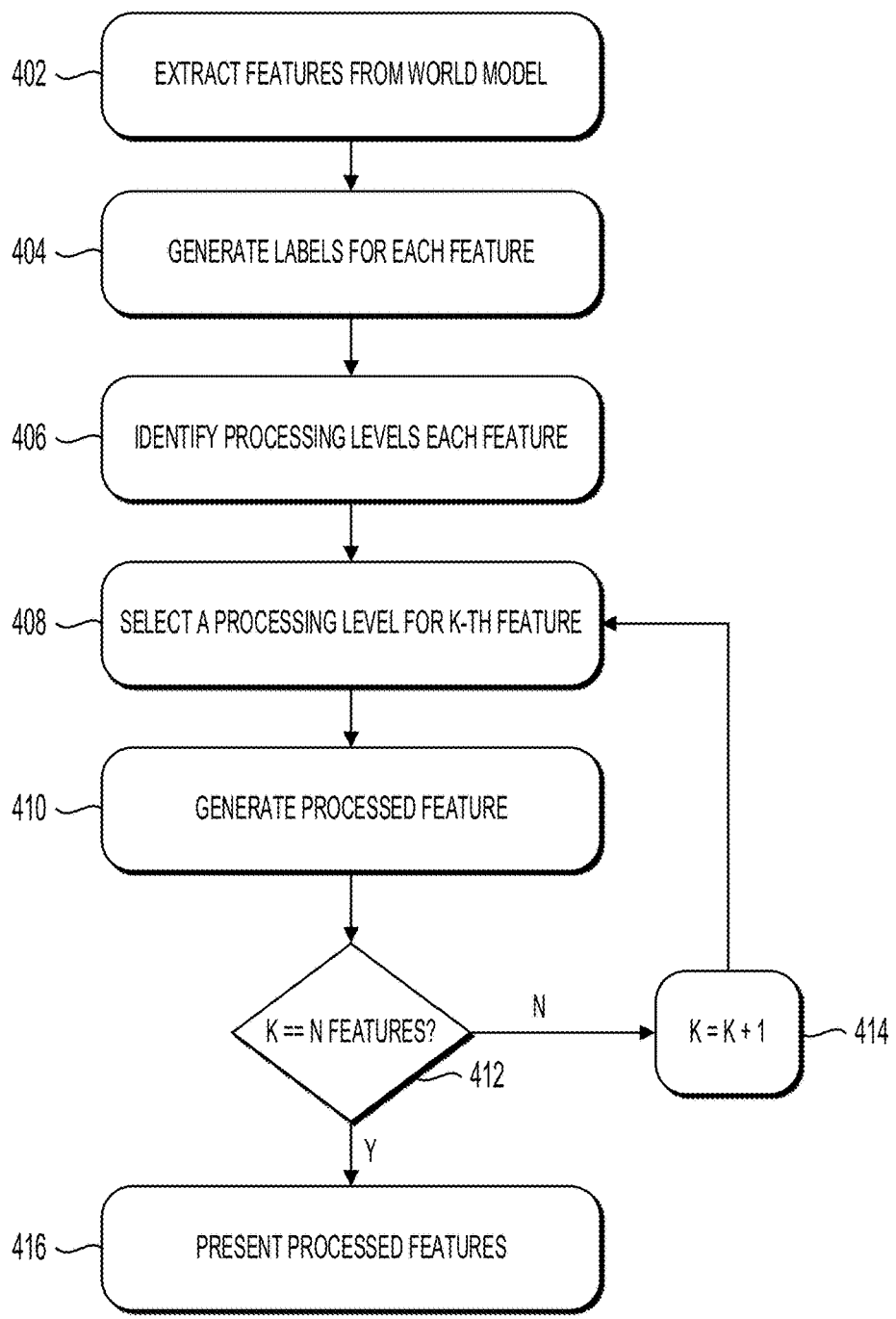
FIG. 4 illustrates a flow diagram of a method for offline task-based feature processing for aerial vehicles, in accordance with one or more implementations.

Referring now to FIG. 4, depicted is a flow diagram of a method 400 for offline task-based feature processing for aerial vehicles, in accordance with one or more implementations. The method 400 may be implemented or performed, for example, by a sensor processing system (e.g., the sensor processing system 110) of an aerial vehicle. In brief overview, the sensor processing system can extract features from a world model (402), generate labels for each feature (404), identify processing levels for each feature (406), select a processing level for the k-th feature (408), generate a processed feature (410), determine whether the counter register k is equal to the number of features n (412), increment the counter register k (414), and present the processed features (416).

In further detail, the sensor processing system can extract features from a world model (402). To extract features from the world model, the sensor processing system can identify one or more extraction models associated with a task assigned to the aerial vehicle, according to the task information of the task assigned to the aerial vehicle. The sensor processing system can then apply the extraction models to the sensor information to generate one or more features, as described in greater detail herein above in connection with FIG. 1. For example, the sensor processing system can access the task information to retrieve a list of models associated with aerial firefighting and execute the identified models on thermal maps retrieved from the world model. The features can correspond to one or more portions of interest of the sensor information in the world model.

The sensor processing system can generate labels for each feature (404). Once the sensor processing system has extracted one or more features, the sensor processing system can generate a label for each feature extracted from the world model. To do so, the sensor processing system can execute one or more classification models associated with the task assigned to the aerial vehicle over the extracted features, as described in further detail above in connection with FIG. 1. The sensor processing system can identify the classification models associated with the task by accessing and retrieving identifiers of the classification models from the task information. The classification models can be any sort of classification model, such as a neural network. To classify each feature, the sensor processing system can provide each feature as input to the one or more identified classification models. Then, the sensor processing system can determine a label for each feature by identifying a label corresponding to the classification of the feature.

The sensor processing system can identify processing levels for each feature (406). A processing level corresponds to an amount of computation processing performed on the feature, for example, prior to determining whether to present the feature to an operator of the aerial vehicle. In general, each processing level can utilize a different amount of computing resources, and thus the sensor processing system performs a type of load balancing by identifying and selectively applying processing levels for each feature. To identify potential processing levels to apply to each feature, the sensor processing system can access a lookup table of processing levels (e.g., not pictured but stored in the memory of the sensor processing system, etc.), to retrieve one or more processing levels associated with the label associated with each feature.

The sensor processing system can select a processing level for the k-th feature (408). The counter register k can correspond to the number of extracted features that have been processed. If it is the first iteration of this loop, the counter register k can be set to an initialization value (e.g., zero). In some implementations, the sensor processing system 110 can select a subset of the features 155 to process. For example, to select a subset of the features 155, the sensor processing system 110 can first use a ranking model to assign a ranking to each feature 155, as described in detail above in connection with FIG. 1. The sensor processing system can then select processing levels based on the ranking of the features, the distance of the features in the world model from the aerial vehicle, or a combination thereof.

The sensor processing system can generate a processed feature (410). The sensor processing system can generate one or more processed features by applying the selected processing level to each selected feature. To apply a processing level, the sensor processing system can identify each of the operations corresponding to the processing level and the corresponding label. For example, the sensor processing system can identify each processing operation associated with the selected processing level and the selected feature label from a lookup table. Upon identifying each processing operation, the sensor processing system can perform each processing operation iteratively to generate the processed features. In some implementations, the sensor processing system can apply the processing operation directly to the sensor information corresponding to the feature to generate the processed features, as described herein above in connection with FIG. 1.

The sensor processing system can determine whether the counter register k is equal to the number of features n (412). To determine whether all extracted features have been processed using the appropriate processing level, the sensor processing system can compare the counter register k used to track the number of processed features to the total number of extracted features n. If the counter register k is not equal to (e.g., less than) the total number of extracted features n, the sensor processing system can execute (STEP 414). If the counter register k is equal to (e.g., equal to or greater than) the total number of extracted features n, the sensor processing system can execute (STEP 416).

The sensor processing system can increment the counter register k (414). To track the number of processed features, the sensor processing system can add one to the counter register k to indicate the total number of processed features that have been processed used by the sensor processing system, and to select the next feature to process. After incrementing the value of the counter register k, the sensor processing system can execute (STEP 408).

The sensor processing system can present the processed features (416). The sensor processing system can present the processed features on one or more of the display devices of the aerial vehicle. As described herein above, the sensor processing system can include image data or display instructions that cause the display devices to present the processed features to the user operating the aerial vehicle. To present the processed features, the sensor processing system can retrieve the processed features from memory and communicate the features to one or more display devices. In some implementations, the sensor processing system can select which of the display devices to display the processed features (e.g., the image data, annotated sensor information, etc.) based on the labels corresponding to the processed features, as described in greater detail above in connection with FIG. 1. In some implementations, the sensor processing system can transmit the processed features to one or more of remote devices via a communications interface.

B. Computer System

Figure 5:
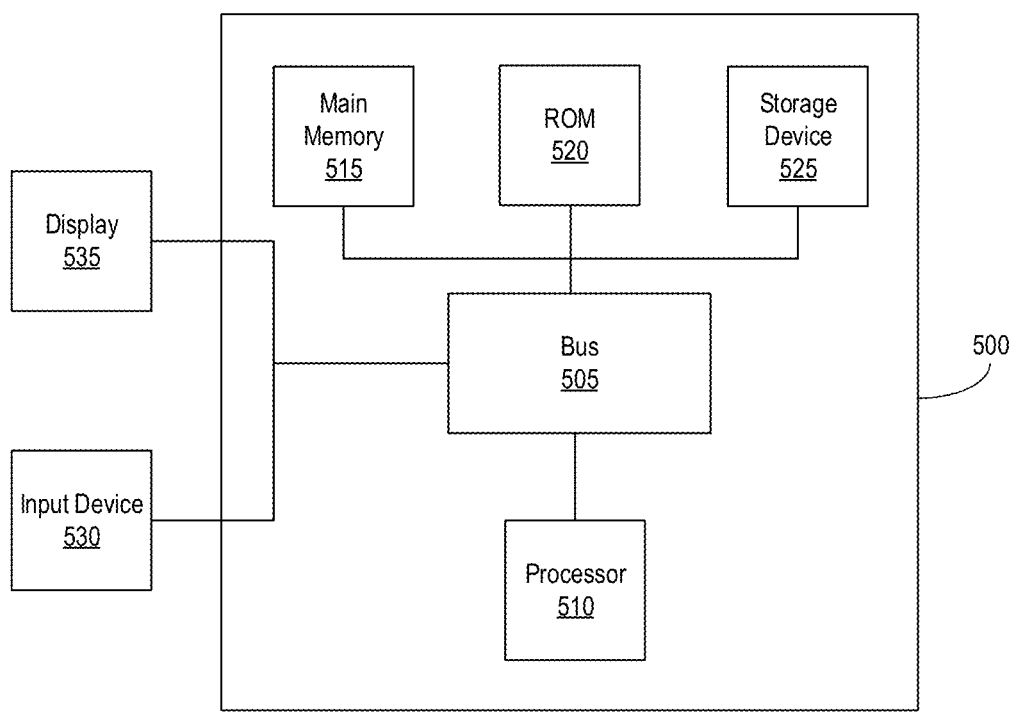
FIG. 5 illustrates a block diagram of an example computer system useful in implementing one or more components detailed herein.

Referring now to FIG. 5, depicted is a block diagram of an example computer system 500. The computer system or computing device 500 can include or be used to implement the system 100, or its components such as the computing device 110, the autonomy system 120, and the remote devices 140. The computing system 500 includes at least one bus 505 or other communication component for communicating information and at least one processor 510 or processing circuit coupled to the bus 505 for processing information. The computing system 500 can also include one or more processors 510 or processing circuits coupled to the bus 505 for processing information. The computing system 500 also includes at least one main memory 515, such as a random access memory (RAM) or other dynamic storage device, coupled to the bus 505 for storing information, and instructions to be executed by the processor 510. The computing system 500 may further include at least one read only memory (ROM) 520 or other static storage device coupled to the bus 505 for storing static information and instructions for the processor 510. A storage device 525, such as a solid state device, magnetic disk, or optical disk, can be coupled to the bus 505 to persistently store information and instructions.

The computing system 500 may be coupled via the bus 505 to a display 535, such as a liquid crystal display, or active matrix display, for displaying information to a user such as an administrator of the data processing system. An input device 530, such as a keyboard or voice interface may be coupled to the bus 505 for communicating information and commands to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the display devices 130, or other component of FIG. 1.

The processes, systems, and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components and illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware- or computer-based components.

The systems described above can provide multiple ones of any or each of those components, and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device," "component," or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array), a GPU, or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services and/or distributed computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array), a GPU, or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation.

Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only "A," only "B," as well as both "A" and "B." Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method for offline task-based feature processing for aerial vehicles, comprising:
    extracting, by one or more processors coupled to memory of an aerial vehicle, a plurality of features from a world model generated based on a task associated with the aerial vehicle and sensor information captured by one or more sensors mounted on the aerial vehicle;
    generating, by the one or more processors, a label for each of the plurality of features extracted from the world model;
    identifying, by the one or more processors, a plurality of processing levels based on the plurality of features, wherein the plurality of processing levels each utilize a different amount of computing resources;
    selecting, by the one or more processors, from the plurality of processing levels, a processing level for each feature of a subset of the plurality of features based on i) the task and the label associated with the feature, and ii) a distance in the world model from the aerial vehicle to each of the subset of the plurality of features;
    generating, by the one or more processors, one or more processed features by applying the processing level to a respective feature of the subset of the plurality of features; and
    presenting, by the one or more processors, the one or more processed features on a display device of the aerial vehicle.

2. The method of claim 1, further comprising selecting, by the one or more processors, the task from a plurality of tasks based on the plurality of features extracted from the world model.

3. The method of claim 1, wherein the world model comprises a heat map, and extracting the plurality of features further comprises:
    generating, by the one or more processors, a time derivative of the heat map; and
    extracting, by the one or more processors, the plurality of features from the heat map and the time derivative of the heat map.

4. The method of claim 1, wherein the generating the label for each of the plurality of features further comprises:
    providing, by the one or more processors, each feature of the plurality of features as input to a classification model; and
    determining, by the one or more processors, the label for each feature of the plurality of features based on an output of the classification model.

5. The method of claim 1, further comprising:
    ranking, by the one or more processors and using a ranking model, the plurality of features based on the label of each of the plurality of features and the task; and
    selecting, by the one or more processors, the subset of the plurality of features based on the ranking.

6. The method of claim 5, wherein selecting the subset of the plurality of features further comprises selecting, by the one or more processors, a predetermined number of the plurality of features having a ranking that is greater than a ranking of other features of the plurality of features.

7. The method of claim 5, further comprising:
detecting, by the one or more processors, a change in the world model corresponding to the plurality of features;
updating, by the one or more processors, the ranking of the plurality of features based on the change in the world model; and
replacing, by the one or more processors, a feature in the subset of the plurality of features with a second feature of the plurality of features previously excluded from the subset based on the updated ranking.

8. The method of claim 1, wherein the task is aerial firefighting and the subset of the plurality of features includes one or more of a flame front, a hot spot, an area of high fuel concentration, or a previously burned area, and wherein presenting the one or more processed features on the display device of the aerial vehicle further comprises:
generating, by the one or more processors, a highlight annotation for each of the subset of the plurality of features based on the label of each of the subset of the plurality of features; and
presenting, by the one or more processors on the display device of the aerial vehicle, each of the subset of the plurality of features with the highlight annotation.

9. The method of claim 1, wherein the task is landing the aerial vehicle and the one or more processed features include one or more of a structure, a runway, or runway markings, and wherein presenting the one or more processed features further comprises:
assigning, by the one or more processors, a color to each of the structure, the runway, or the runway markings;
generating, by the one or more processors, an annotated image of terrain surrounding the aerial vehicle that depicts each of the structure, the runway, or the runway markings annotated with the color; and
presenting, by the one or more processors, the annotated image on the display device of the aerial vehicle.

10. A system for offline task-based feature processing for aerial vehicles, comprising:
one or more sensors mounted on an aerial vehicle; and
one or more processors coupled to memory of the aerial vehicle, the one or more processors configured to:
extract a plurality of features from a world model generated based on a task associated with the aerial vehicle sensor information captured by the one or more sensors mounted on the aerial vehicle based on a task associated with the aerial vehicle;
generate a label for each of the plurality of features extracted from the world model;
identify a plurality of processing levels based on the plurality of features, wherein the plurality of processing levels each utilize a different amount of computing resources;
select, from the plurality of processing levels, a processing level for each feature of a subset of the plurality of features based on i) the task and the label associated with the feature, and ii) a distance in the world model from the aerial vehicle to each of the subset of the plurality of features;
generate one or more processed features by applying the processing level to a respective feature of the subset of the plurality of features; and
present the one or more processed features on a display device of the aerial vehicle.

11. The system of claim 10, wherein the one or more processors are further configured to select the task from a plurality of tasks based on the plurality of features extracted from the world model.

12. The system of claim 10, wherein the world model comprises a heat map, and the one or more processors are further configured to extract the plurality of features by:
generating a time derivative of the heat map; and
extracting the plurality of features from the heat map and the time derivative of the heat map.

13. The system of claim 10, wherein the one or more processors are further configured to generate the label for each of the plurality of features by:
providing each feature of the plurality of features as input to a classification model; and
determining the label for each feature of the plurality of features based on an output of the classification model.

14. The system of claim 10, wherein the one or more processors are further configured to:
rank, using a ranking model, the plurality of features based on the label of each of the plurality of features and the task; and
select the subset of the plurality of features based on the ranking.

15. The system of claim 14, wherein the one or more processors are further configured to select the subset of the plurality of features by selecting a predetermined number of the plurality of features having a ranking that is greater than a ranking of other features of the plurality of features.

16. The system of claim 14, wherein the one or more processors are further configured to:
detect a change in the world model corresponding to the plurality of features;
update the ranking of the plurality of features based on the change in the world model; and
replace a feature in the subset of the plurality of features with a second feature of the plurality of features previously excluded from the subset based on the updated ranking.

17. The system of claim 10, wherein the task is aerial firefighting and the one or more processed features include one or more of a flame front, a hot spot, an area of high fuel concentration, or a previously burned area, and wherein the one or more processors are further configured to present the one or more processed features on the display device of the aerial vehicle by:
generating a highlight annotation for each of the subset of the plurality of features based on the label of each of the subset of the plurality of features; and
presenting, on the display device of the aerial vehicle, each of the subset of the plurality of features with the highlight annotation.

18. The system of claim 10, wherein the task is landing the aerial vehicle and the subset of the one or more processed features include one or more of a structure, a runway, or runway markings, and wherein the one or more processors are further configured to present the one or more processed features on the display device of the aerial vehicle by:
assigning a color to each of the structure, the runway, or the runway markings;
generating an annotated image of terrain surrounding the aerial vehicle that depicts each of the structure, the runway, or the runway markings annotated with the color; and presenting the annotated image on the display device of the aerial vehicle.

\* \* \* \* \*